United States Patent [19]

Queneau et al.

[11] 4,415,542
[45] Nov. 15, 1983

[54] CONTROLLING SCALE COMPOSITION DURING ACID PRESSURE LEACHING OF LATERITE AND GARNIERITE ORE

[75] Inventors: Paul B. Queneau, Golden; Robert E. Doane, Lakewood; Mark H. Berggren, Golden; Mark W. Cooperrider, Arvada, all of Colo.

[73] Assignee: Compagne Francaise D'Entreprises Minieres, Metallurgiques et D'Investissements, Paris, France

[21] Appl. No.: 390,450

[22] Filed: Jun. 21, 1982

[51] Int. Cl.³ .................. C01G 53/00; C01G 49/00
[52] U.S. Cl. .................. 423/141; 423/150; 423/123; 423/159; 252/80; 203/7
[58] Field of Search .......... 423/150, 141, 140, 123, 423/159; 203/7; 252/80; 75/119; 134/3, 41

[56] References Cited

U.S. PATENT DOCUMENTS

| | | | |
|---|---|---|---|
| 3,720,749 | 3/1973 | Taylor et al. | 423/141 |
| 3,809,549 | 5/1974 | Opratko et al. | 75/115 |
| 3,991,159 | 11/1976 | Queneau et al. | 423/150 |
| 4,098,870 | 7/1978 | Fekete et al. | 423/150 |

Primary Examiner—Edward J. Meros
Assistant Examiner—Robert L. Stoll
Attorney, Agent, or Firm—Michael A. Ciomek; Eugene J. Kalil

[57] ABSTRACT

The scaling of autoclave and leaching-equipment surfaces during the high pressure leaching of nickeliferous oxide and silicate ores is controlled during leaching to favor the formation of scale containing substantial amounts of magnesium sulfate that is more easily removed by chemical dissolution using water or dilute sulfuric acid at temperatures ranging from about 50° C. to 250° C. than scale containing substantial amounts of alunite.

12 Claims, 6 Drawing Figures

CONTROLLING SCALE COMPOSITION DURING ACID PRESSURE LEACHING OF LATERITE AND GARNIERITE ORE

This invention relates to the leaching of nickeliferous oxide and silicate ores and, in particular, to a method of controlling scale formation in order to improve the chemical removal thereof from autoclave surfaces following high-pressure leaching of said ores.

STATE OF THE PRIOR ART

Methods are known to recover nickel and cobalt from lateritic and garnieritic ores. One method, which is referred to as the Moa Bay process, comprises pulping the nickel ore (95% passing 325 mesh) to approximately 40% solids in water, and then selectively leaching the nickel and cobalt with sulfuric acid at elevated temperature and pressure (e.g., 475° F. [245° C.] and 525 psig) to solubilize about 95% each of the nickel and cobalt. The leached pulp is cooled and then washed by countercurrent decantation, with the washed pulp going to tailings. The solution acid pH, which is quite low, and the thus-treated product liquor (containing generally about 4 to 6 grams of nickel per liter) is subjected to sulfide precipitation by preheating the leach liquor and carrying out the precipitation with $H_2S$ in an autoclave at about 250° F. (121° C.) and a pressure of about 150 psig. Usually, nickel sulfide seed is added at the feed end to assist in obtaining substantially complete precipitation of the nickel and cobalt. The nickel and cobalt are thereafter recovered by known means.

A problem in the leaching of lateritic and garnieritic ores is the tendency of scale formation on the walls of the autoclave which must be considered in the design of the high-pressure leach system. This problem is particularly the case with the Moa Bay process. The formation of alunite and hematite deposits on autoclave walls has been well documented by Russian authors describing the Moa Bay operation [R. A. Chaves, V. V. Karelin and Sobolew, *Tsvet Metally*, 9(4), 4 (1968)]. According to the publication, the walls of the autoclaves and of the pipelines tend to be covered with a thick scale layer (upwards of 20 cm).

In Chemical Abstracts (75-24119V), reference is made to a paper entitled "Removal of Deposits From Autoclave After $H_2SO_4$ Leaching Of Oxidized Nickel Ore at The Moa Plant" (Trudy Proektnogo I. Nauchno—Issledovatelskogo Instituta "Gipronikel") which states that scale deposits of mostly iron and aluminum sulfate are formed during the $H_2SO_4$ leaching of nickel oxide ores. These deposits rapidly fill the main autoclave and heat exchange equipment. The leaching operation must subsequently be stopped for cleaning, which results in a decrease in plant efficiency.

Attempts at chemically removing the scale using sulfuric acid were not successful in that $H_2SO_4$ effected only partial dissolution of the deposits. The use of sodium hydroxide solutions at temperatures of 130° C. or 190° C., depending on sodium hydroxide concentration, appeared to be more successful.

Formation of such deposits adversely affect process continuity, and results in a forced shutdown about once a month in order to clean the autoclaves and the pipelines, a process which takes 5 to 7 days.

Generally speaking, descaling techniques involve the use of mechanical devices (hammer, spatulas, etc.). Such techniques are tedious when descaling titanium-clad autoclaves in that the titanium cladding is thin and extra care must be taken to avoid damage to the cladding.

RELATED APPLICATION

In related co-pending application Ser. No. 390,441 filed June 21, 1982, a method is disclosed for the chemical removal of scale from autoclave surfaces. The scale is composed of oxides of aluminum, iron and magnesium in the form of insoluble oxides and sulfates. Following completion of a leaching campaign, the scale is chemically removed by flushing the autoclave with a sulfuric acid solution containing about 20 to 100 gpl $H_2SO_4$ at a temperature in the range of about 150° C. to 250° C. and a pressure ranging from about 55 psig to 560 psig for a time sufficient to effect substantial removal of the scale.

The scale is generally a mixture of sulfates of aluminum, iron and magnesium. It is not removed too easily due to the more refractory nature of aluminum and iron compounds as compared to magnesium sulfate, which may be readily dissolved in water or dilute sulfuric acid depending upon the amount of iron and aluminum present and the temperature. Because magnesium sulfate is more easily solubilized, it serves as the focal point for dissolution in aqueous solution, whereby the dissolution and/or the physical removal of the scale is effected as evidenced by inspection of the autoclave following completion of the descaling treatment as described in the aforementioned related application.

Since magnesium sulfate is much more readily solubilized than aluminum and iron scaling compounds, it would be desirable to control the leaching operation such that any scale that forms will contain a substantial amount of magnesium sulfate and thus render the scale more easily removable using water or dilute sulfuric acid.

We have found that this can be achieved by carrying out the leaching process on feed material in which the magnesium content is controlled so that the magnesium content of the resulting pregnant liquor is maintained at a level that inhibits formation of alunite scale by favoring the formation of a scale containing substantial amounts of magnesium sulfate with or without iron. We have found that this type of scale, even with hematite present, can be chemically removed easily and much faster than a scales in which substantial amounts of alunite and hematite are present together with magnesium sulfate.

OBJECTS OF THE INVENTION

It is an object of the invention to provide a method for chemically removing scale from autoclave surfaces formed during the high-temperature, high-pressure leaching of nickeliferous oxide and silicate ores.

Another object of the invention is to provide a method for controlling the autoclave leaching of nickeliferous oxide and silicate ores whereby the tendency to form scale containing substantial amounts of alunite is greatly inhibited while favoring the formation of scale containing substantial amounts of magnesium sulfate that is easier to remove by chemical dissolution.

These and other objects will more clearly appear when taken in conjunction with the following disclosure, claims and the accompanying drawings, wherein:

STATEMENT OF THE INVENTION

Stating it broadly, the invention is directed to a method of controlling the leaching of nickel lateritic ores such that scale produced on autoclave surfaces during the leaching of the ores is of such a character because of the leaching control that it can be easily removed from the surfaces by chemical dissolution. This is particularly the case when leaching nickeliferous oxide ores containing substantial amounts of aluminum and iron. As pointed out in related application Ser. No. 390,441, the disclosure of which is incorporated herein by reference such scale generally occurs when operating at autoclave leach temperatures of about 180° C. to 300° C., e.g. preferably about 225° C. to 280° C., such as 270° C., at elevated pressures ranging from about 335 psig to 900 psig.

Figure 1:
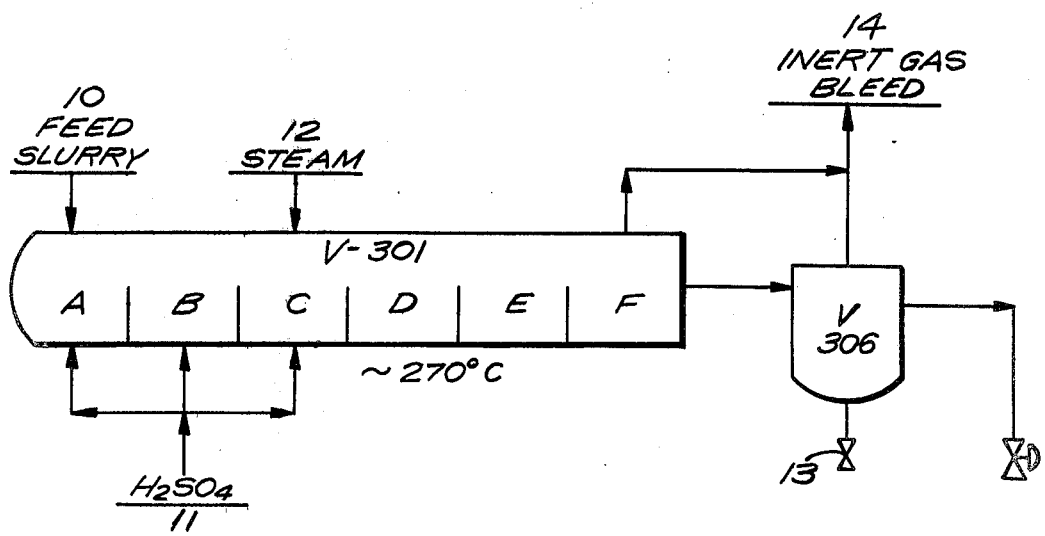
FIG. 1 is a schematic of a typical high-pressure leach vessel or autoclave including a level-control pot which is subject to scale formation during high pressure leaching of lateritic ores.

A typical autoclave-leaching process is that depicted in FIG. 1 to which a nickeliferous oxide and silicate ore is fed in the form of a water slurry 10 which is fed to compartment A of the multi-stage autoclave V-301 containing serially connected compartments A to F. The acid may be fed at an acid-to-ore ratio of about 0.15 to 0.8 by weight by distributing the total amount of acid 11 to compartments A, B and C at a distribution ratio depending upon feed composition, for example, 60%, 25% and 15%, respectively. Steam 12 is added to control the temperature at about 270° C. As leaching progresses, the leached slurry is continuously passed to level-control vessel V-306 and there via valve 13 to various let-down stages (i.e., flashpots) not shown. Inert gas bleed 14 is provided for bleeding gases to the atmosphere from both the autoclave and level-control vessel V-306 as shown in the figure.

After a period of time, scale forms on the surfaces of the autoclave which is difficult to remove. We have discovered that, by maintaining the liquor in each autoclave compartment at saturation with respect to magnesium, the conditions will be conducive to inhibiting the formation of alunite scale but favorable to the formation of a magnesium-rich scale, such that the resulting scale is characterized by being rapidly solubilized in water or dilute sulfuric acid and, therefore, easy to remove.

DETAILS OF THE INVENTION

A characteristic of some lateritic ores is that the ores can be split into two size fractions, a fines fraction and a coarse fraction, the coarse fraction being higher in magnesium content and providing the necessary amounts of magnesium for carrying out the novel process.

All or a portion of the coarse fraction is dried and may be calcined at a temperature of about 650° C. in order to improve its reactivity. The calcined feed serves the purpose of adjusting the pH of the pregnant liquor obtained from the fines fraction, the fines fraction being pulped and pumped directly to the high-pressure leach in autoclave V-301 (FIG. 1). Alternatively, the ore may be mined as separate "L" (limonite) and "G" (garnierite) fractions and handled in separate one preparation circuits, the "G" fraction having a substantially higher magnesium content than the "L" fraction. Generally speaking, the pulp density may range from about 20% to 50% and, more preferably, from about 25% to 35% solids.

Figure 2:
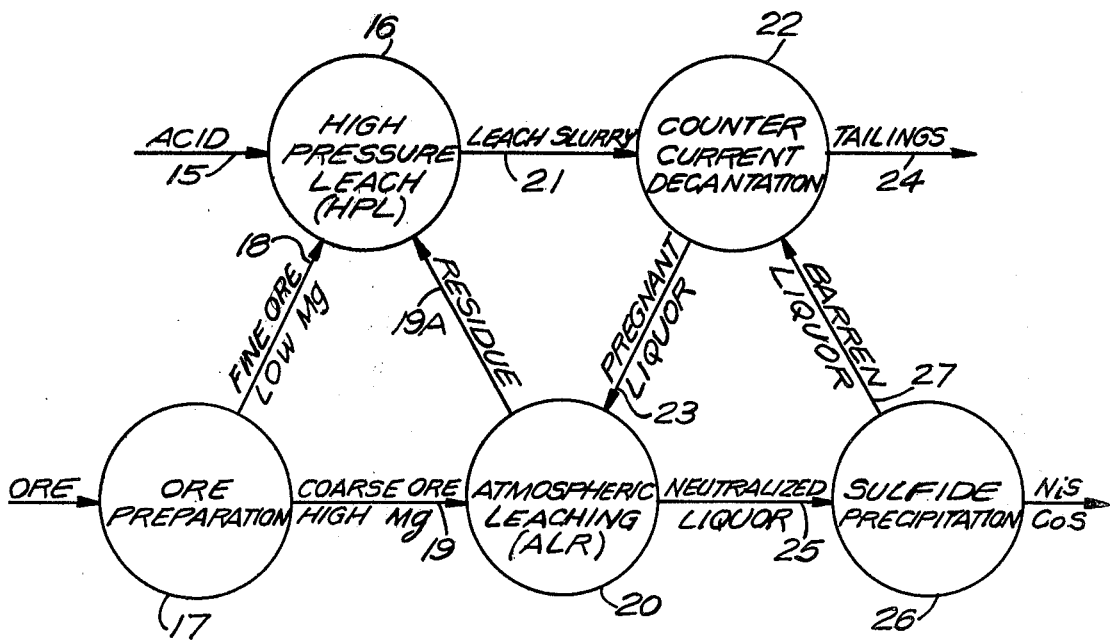
FIG. 2 is a block diagram of one embodiment of a leaching process for carrying out the invention.

One embodiment of a process for carrying out the invention using a high-magnesium fraction in addition to a low-magnesium fraction for obtaining the kind of scale desired is illustrated in the block diagram of FIG. 2 which shows acid 15 being fed to high-pressure leach stage 16. Ore feed is prepared at 17 by splitting the ore into a low-magnesium fines fraction 18 and a high-magnesium coarse fraction 19, with the fines fraction 18 going to high pressure leach 16 and the coarse fraction 19 going to atmospheric leach 20 to be used for pH control. Leach slurry 21 leaves the high pressure leach stage and enters the countercurrent-decantation stage (CDD) where the pregnant liquor 23 is separated from tailings 24 and the pregnant liquor 23 fed to the atmospheric-leach circuit 20 where it partially leaches coarse ore 19 and at the same time is neutralized by the high-magnesium present to provide a neutralized liquor 25 at a raised pH (about 2.0 to 2.8) conducive to effect the sulfide precipitation 26 of NiS and CoS. The high-magnesium residue 19A in the meantime has been fed to high-pressure leach 16 to increase the magnesium content of the liquor in the autoclave such as to inhibit the scale formation of alunite while favoring the formation of a limited quantity of scale rich in magnesium sulfate. Following sulfide precipitation of NiS and CoS, the neutralized barren liquor 27 that remains is used to displace pregnant liquor 23 from the tailings at CCD 22. This technique is illustrative of one embodiment that may be employed in carrying out the invention. As will be clearly understood by those skilled in the art, other variations of the process may be employed.

In a series of tests, four campaigns were conducted using various blends of New-Caledonian limonite and garnierite ores. The duration of these campaigns ranged from 12 to 26 days. The HPL (high pressure leach) feed (see FIG. 3) was pumped at 25 to 30 percent solids into autoclave compartment A. This limonite fraction was over 90 percent minus 325 mesh, and consisted primarily of goethite (i.e., $\alpha$—FeOOH). There was also 3 to 5 percent aluminum, mainly as gibbsite (i.e., $\alpha$—Al(OH)$_3$). Magnesium was present primarily as magnesium-iron silicates, although there was also some chromium spinel. Roasted and atmospheric-leached residue (ALR) pumped into the fourth or fifth autoclave compartment (FIG. 3) consumed excess acid and solubilized residual nickel values. The ALR solids contained magnesium-iron silicates, amorphous silica and quartz, hematite and iron hydroxide, and aluminum hydroxide.

The autoclave feed compositions, feed rate and product composition is shown in Table I below:

TABLE I

| | CAMPAIGN | | | |
|---|---|---|---|---|
| | 1 | 2 | 3 | 4 |
| HPL Feed* | | | | |
| Mg, % | 2.6 | 3.2 | 5.0 | 6.9 |
| Fe, % | 40 | 38 | 33 | 27 |
| Al, % | 4.7 | 4.8 | 3.7 | 3.3 |
| Solids, kg/hr | 400 | 380 | 350 | 280 |
| ALR Feed* | | | | |
| Mg, % | 3.7 | 4.1 | 4.1 | 4.4 |
| Fe, % | 21 | 18 | 17 | 17 |
| Al, % | 3.4 | 3.4 | 2.9 | 3.1 |
| Solids, kg/hr | 100 | 100 | 95 | 80 |

*HPL = high pressure leach;
ALR = atmospheric leach residue.

As will be noted from Table I, the HPL feeds of runs or campaigns 3 and 4 contain substantially more magnesium than the HPL feeds of runs or campaigns 1 and 2.

Magnesium sulfate deposits were found in autoclave compartments A through F (FIG. 3), and in the level-control pot V-306 (FIG. 1) located immediately upstream from the first pressure let-down choke or valve 13 (FIG. 1). The deposits were reddish-brown (no change in color on drying) and fine-grained. X-ray diffraction showed that the magnesium compounds were $Mg(Ni)SO_4 \cdot 6H_2O$ and $Mg(Ni)SO_4 \cdot H_2O$. The Mg/Ni ratio ranged from about one to three, roughly corresponding to the ratio of the Mg to Ni concentration in the aqueous solution from which the scale deposited. The distribution of concentrated $H_2SO_4$ fed into the first three compartments of the autoclave was 60/25/15. The addition point for the atmospheric leach residue (ALR) was into compartment E for Run 1, and into compartment D for subsequent runs.

Table II gives typical analyses of scale samples (dried at room temperature) that were collected from the north wall of the autoclave compartments after each run. Samples were also taken from the spool piece between the autoclave (V301) and the level-control pot (V306), as well as from the bottom of the level-control pot. A scale sample taken from the V301–306 spool piece following Run 1 consisted of fragments of alunite-hematite and $MgSO_4 \cdot H_2O$ wall scale (apparently dislodged from V301) cemented by $MgSO_4 \cdot H_2O$. The piece assayed 4.8% Mg, 13% Fe, 7.5% Al, and 15% S. Particles collected from the bottom of the level-control pot were subspherical nodules 5 to 10 mm in diameter and were often rimmed with alunite. When a nodule was broken open, its interior readily dissolved in cold water.

TABLE II

COMPOSITION OF SCALE SAMPLES FROM THE NORTH WALL OF THE HIGH-PRESSURE LEACH REACTOR

| Sample Identification | | Scale Analysis (Weight-Percent) | | | |
|---|---|---|---|---|---|
| | | Mg | Fe | Al | S |
| Run 1 | V301A | 0.3 | 6.9 | 17 | 14 |
| | B | .09 | 24 | 12 | 10 |
| | C | .2 | 16 | 15 | — |
| | D | .2 | 17 | 13 | 20 |
| | E | .6 | 13 | 16 | — |
| | F | .2 | 10 | 17 | — |
| Run 2 | V301A | 0.05 | 11 | 15 | 13 |
| | B | .07 | 36 | 8.7 | 8.3 |
| | C | .05 | 55 | 3.1 | — |
| | D | 3.4 | 9.5 | 11 | 15 |
| | E | 0.07 | 6 | 17 | — |
| | F | .02 | 8.8 | 16 | — |
| | V306 | 11 | 5.6 | 1.3 | 20 |
| Run 3 | V301A | 11 | 6.8 | 1.0 | 21 |
| | B | 0.04 | 25 | 11 | 10 |
| | C | .1 | 34 | 8.2 | 7.3 |
| | D | 11 | 5.0 | 1.0 | 21 |
| | E | 12 | 4.6 | 0.8 | 21 |
| | F | 0.2 | 41 | 2.4 | 2.1 |
| | V306 | 14 | 3.9 | 0.8 | 20 |
| Run 4 | V301A | 12 | 5 | 0.8 | 17 |
| | B | 0.3 | 49 | <4 | 3.9 |
| | C | .2 | 52 | <2 | 1.9 |
| | D | 6.4 | 11 | <6 | — |
| | E | 8.9 | 9.9 | <2 | 16 |
| | F | 6.2 | 16 | <4 | 13 |
| | V306 | 6.6 | 17 | <2 | 11 |

As will be noted from Table II, the scale from runs 3 and 4 contained substantially more magnesium than the scale of runs 1 and 2. The high-magnesium scale is much easier to remove by chemical dissolution.

Table III lists the thickness of the scale deposits collected from the north wall of each autoclave compartment following each of four campaigns. Scale-thickness values have been converted to mm per 30-day month to facilitate comparisons between the four campaigns. No compensation was made in the table for redissolution of magnesium scale when flushing the autoclave with water during the shutdown period. Autoclave flushing was particularly thorough following Run 3.

TABLE III

MILLIMETERS PROJECTED SCALE THICKNESS PER 30-DAY MONTH FOR THE NORTH WALL OF THE PROTOTYPE PLANT AUTOCLAVE

| Campaign | A | B | C | D | E | F |
|---|---|---|---|---|---|---|
| 1 | 12.5 | 9.6 | 1.2 | 1.1 | 0.2 | — |
| 2 | 11.6 | 2.8 | 0.8 | 8.3 | 1.4 | 1.4 |
| 3 | 7.4 | 6.2 | 1.5 | 7.3 | 6.4 | 3.6 |
| 4 | 4.7 | 4.8 | 4.3 | 7.9 | — | 3.7 |

Table IV summarizes average magnesium and free-acid concentrations obtained during each campaign for each of the six autoclave compartments. Care should be exercised in utilizing these numbers, in that only the $H_2SO_4$ assays can be taken at face value, assuming one ignores the $HSO_4^-$-shift reaction. The magnesium determinations represent not only the aqueous Mg soluble at temperature, but also the often large quantity of Mg that dissolved from the residue as magnesium sulfate when the sample was cooled below 200° C.

TABLE IV

APPARENT CONCENTRATION OF AQUEOUS Mg AND $H_2SO_4$ IN THE HIGH PRESSURE AUTOCLAVE COMPARTMENTS

| Run # | Apparent Analyses (gpl) in the Compartments | | | | | | | | | | | |
|---|---|---|---|---|---|---|---|---|---|---|---|---|
| | A | | B | | C | | D | | E | | F | |
| | Mg | $H_2SO_4$ | Mg | $H_2SO_4$ | Mg | $H_2SO_4$ | Mg | $H_2SO_4$ | Mg | $H_2SO_4$ | Mg | $H_2SO_4$ |
| 1 | 7.0 | 33 | 7.3 | 42 | 7.3 | 47 | 7.6 | 46 | 8.2 | 40 | 8.3 | 40 |
| 2 | 10.0 | 34 | 11.7 | 45 | 11.1 | 51 | 10.8 | 45 | 11.4 | 45 | 10.4 | 45 |

TABLE IV-continued

APPARENT CONCENTRATION OF AQUEOUS Mg AND H₂SO₄ IN THE HIGH PRESSURE AUTOCLAVE COMPARTMENTS

| Run # | Apparent Analyses (gpl) in the Compartments |||||||||||| 
|---|---|---|---|---|---|---|---|---|---|---|---|
| | A || B || C || D || E || F ||
| | Mg | $H_2SO_4$ | Mg | $H_2SO_4$ | Mg | $H_2SO_4$ | Mg | $H_2SO_4$ | Mg | $H_2SO_4$ | Mg | $H_2SO_4$ |
| 3 | 12.0 | 32 | 12.9 | 48 | 13.6 | 56 | 13.4 | 46 | 12.4 | 46 | 12.6 | 44 |
| 4 | 15.7 | 33 | 18.3 | 49 | 17.9 | 58 | 15.4 | 44 | 15.7 | 42 | 15.2 | 40 |

Figure 4:
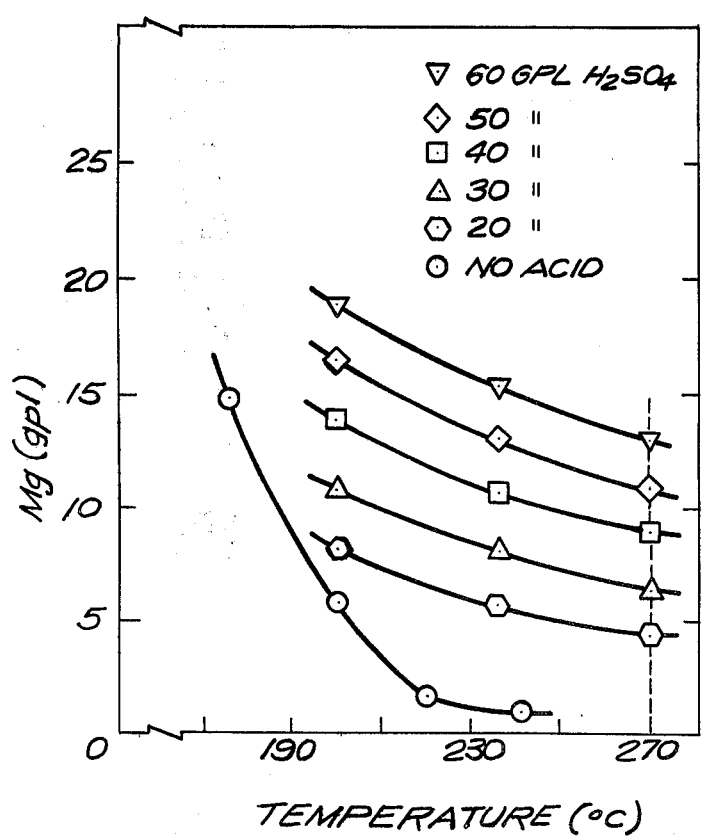
FIG. 4 is a graph depicting a set of curves showing the solubility of magnesium sulfate in grams per liter of magnesium as a function of temperature at various levels of sulfuric acid concentration.

The magnesium sulfate solubility relationship as a function of acid concentration and temperature will be apparent by referring to FIG. 4 (W. L. Marshall and R. Slusher, *J. Chem. Eng. Data*, 10(4), 353 [October 1965]). Above 200° C., addition of sulfuric acid increases magnesium solubility. These data apply to a solution free of other salts. A number of solubility experiments were also performed to determine the effect of the nickel, iron, and aluminum salts in laterite leach liquor on the high-temperature solubility of magnesium sulfate. With 20 gpl free acid, the solubility of magnesium in laterite leach liquor at 200° C. was about 25% higher than that shown in FIG. 4. Thus, a concentration of about 8 gpl total aqueous nickel, iron and aluminum does not decrease the solubility of magnesium. Which hydrate of magnesium sulfate is the stable phase depends on temperature. The hexahydrate is stable at about 60° to 80° C., whereas at higher temperatures, the monohydrate becomes the stable phase.

A comparison of the concentration of aqueous magnesium at room temperature (in slurry samples collected from the 270° C. prototype autoclave) was made with the solubility values of FIG. 4. This comparison appears in Table V. Also shown is "Mg-scale quantity number" obtained by multiplying the measured scale thickness in mm (Table III) by the magnesium analysis of the scale (Table II). For Run 1, the solution concentration in all six compartments never exceeded the solubility of magnesium. See Table V. Therefore, there was very little magnesium sulfate scaling in the prototype plant autoclave during this run.

TABLE V

COMPARISON OF APPARENT AQUEOUS Mg WITH Mg SOLUBILITY AND THE "Mg-SCALE QUANTITY" (DIMENSIONLESS)

| Run # | Parameter* | Autoclave Compartment ||||||
|---|---|---|---|---|---|---|---|
| | | A | B | C | D | E | F |
| 1 | Apparent Mg, gpl | 7.0 | 7.3 | 7.3 | 7.6 | 8.2** | 8.3 |
| | Mg solubility, gpl | 7.5 | 9.6 | 10.3 | 10.2 | 9.1 | 9.1 |
| | Mg-scale quantity | 4.0 | 0.9 | 0.2 | 0.2 | 0.1 | — |
| 2 | Apparent Mg, gpl | 10.0 | 11.7 | 11.1 | 10.8** | 11.4 | 10.4 |
| | Mg solubility, gpl | 7.6 | 10.1 | 11.2 | 10.1 | 10.1 | 10.1 |
| | Mg-scale quantity | 0.6 | 0.2 | 0.04 | 28.0 | 0.1 | 0.3 |
| 3 | Apparent Mg, gpl | 12.0 | 12.9 | 13.9 | 13.4** | 12.4 | 12.6 |
| | Mg solubility, gpl | 7.2 | 10.6 | 12.0 | 10.2 | 10.2 | 9.9 |
| | Mg-scale quantity | 84.0 | 0.3 | 0.2 | 83.0 | 74.0 | 0.9 |
| 4 | Apparent Mg, gpl | 15.7 | 18.3 | 17.9 | 15.4** | 15.7 | 15.2 |
| | Mg solubility, gpl | 7.3 | 10.9 | 12.5 | 9.9 | 9.6 | 9.1 |
| | Mg-scale quantity | 38.0 | 1.0 | 0.9 | 50.0 | — | 23.0 |

*Apparent Mg is the analysis of the aqueous phase of the slurry sampled from each autoclave compartment. This assay is the sum of magnesium soluble at autoclave temperature, plus magnesium solubilized from $MgSO_4.H_2O$ during cooling of the sample.
Mg solubility is the solubility of magnesium at 270° C., as read from FIG. 4.
Mg-scale quantity is the product of scale thickness (Table III) multiplied by the magnesium assay of the scale (Table II).
**Compartment to which the ALR feed was added.

During Runs 2, 3 and 4, the solubility of magnesium sulfate was exceeded by a substantial margin. The quantity of scale was highest in the autoclave compartments where magnesium-containing ore was added (i.e., A and D). Magnesium scaling of compartments B and C was nil because the liquor had already been relieved of its excess magnesium via scaling in compartment A. This relief of scaling propensity was enhanced by acid added to B and C, which increased the solubility of magnesium (FIG. 4). Scaling recommenced in D not only due to ALR addition of solids, but also due to the decreasing liquor acidity. This decreased acidity caused a portion of the magnesium soluble in C to precipitate in D. One would have expected magnesium scaling in compartment A of Run 2 based on the 2.4 gpl solubility differential. It is possible there was sufficient intermittent backmixing from the more acidic compartment B solution to dissolve magnesium scale build-up in compartment A. Or possibly a brief water wash prior to shutdown dissolved away the compartment A scale. The same water, now loaded with magnesium, would be less effective in dissolving magnesium scale from compartment D.

It was expected that more scale would be found after Run 4 than 3, based on apparent leach liquor magnesium concentrations. The lower measured scale thickness following Run 4 probably was due to the autoclave being washed with a greater volume of water during the shutdown procedure that followed this high-magnesium campaign. Thus, residual magnesium scale was greater following Run 3 than following Run 4 due to the difference in flush-out procedures.

It is clearly apparent that the deposition of a scale based of magnesium sulfate has an effect on alunite and hematite scale formation. During Run 1, the solubility of magnesium was not exceeded in autoclave compartment A (See Table V). The scale deposited in compartment A was composed of refractory intergrown crystals of alunite and hematite (Table II). When the autoclave feed was changed over to high-magnesium material (Run 4; Table I), deposition of alunite essentially ceased. The scale deposit became $MgSO_4.H_2O$ containing a fine dispersion of iron plus traces of aluminum.

Further evidence of the effect of magnesium in changing the quantity of aluminum and iron in the autoclave scale is presented in Table VI below. The quantity of scale shown in this table is attained by multiplying the scale thickness on the north wall (mm/month, as shown in Table III) by either the Mg, Al, or Fe analysis of the scale (Table II). Thus, in compartment A of Run 1, the scale was primarily alunite; magnesium sulfate content was low. The same was true for Run 2. However, in Runs 3 and 4, the compartment A scale was primarily magnesium sulfate. Alunite content was low. Hematite was significant, but lower than in Runs 1 and 2.

TABLE VI

EFFECT OF MAGNESIUM ON LOCATION AND EXTENT OF ALUNITE AND HEMATITE SCALING

| | Feed (kg/hr) | | | Quantity of Scale | | | | | | | | |
| | | | | Stage A | | | Stage B | | | Stage C | | |
| Run # | Mg | Al | Fe | Mg | Al | Fe | Mg | Al | Fe | Mg | Al | Fe |
| --- | --- | --- | --- | --- | --- | --- | --- | --- | --- | --- | --- | --- |
| 1 | 10 | 20 | 160 | 4 | 220 | 85 | 0.9 | 120 | 230 | 0.2 | 22 | 20 |
| 2 | 12 | 18 | 140 | 0.6 | 180 | 130 | 0.2 | 5 | 100 | 0.1 | 2 | 40 |
| 3 | 18 | 13 | 120 | 85 | 7 | 50 | 0.3 | 70 | 160 | 0.2 | 12 | 50 |
| 4 | 19 | 9 | 75 | 55 | 4 | 30 | 1.0 | <20 | 240 | 0.9 | <9 | 230 |

Very little magnesium deposited in autoclave compartments B and C due to the relatively high acid concentration (Table IV). Iron deposition in compartments B and C was generally lower, in the high-magnesium runs. Sulfuric acid concentration was also higher in compartments B and C during the high-magnesium runs (Table IV). Both the extent of hydrolysis of aluminum and iron at a given temperature and acid concentration are increased as the level of magnesium sulfate is increased. At 270° C., increasing acid concentration slows down the rate of aluminum hydrolysis much more than the rate of iron hydrolysis. It is therefore hypothesized that where there is insufficient magnesium to deposit magnesium sulfate, deposition of hematite and alunite on autoclave surfaces should increase with increasing magnesium concentration. Increasing acid concentration should retard aluminum hydrolysis relative to iron hydrolysis, particularly at shorter retention time.

Magnesium sulfate deposition sharply inhibits the rate of alunite scaling. For instance, the highest scaling rate measured on the north wall of the autoclave was 12 mm/month in compartment A following Run 1 (low magnesium). This scale was primarily alunite assaying 17% Al and 0.3% Mg. Doubling the magnesium content of the feed (Run 3) deposited 7 mm/month of primarily magnesium sulfate scale assaying 1% Al and 11% Mg. This substitution of magnesium for aluminum is important for autoclave descaling. Unlike alunite and hematite, magnesium sulfate hydrate dissolves rapidly in water or dilute acid at temperatures below 200° C. Hematite precipitates on autoclave internal surfaces along with magnesium sulfate, but the hematite is dispersed within the magnesium sulfate matrix. Magnesium sulfate has an inverse solubility with temperature. Cooling the 270° C. autoclave to 180° C. sharply increases magnesium solubility, resulting in magnesium dissolution and liberation of the hematite. Thus, magnesium sulfate provides a means not only for inhibiting alunite scaling, but also for facilitating removal of hematite scale.

Figures 5, 6:
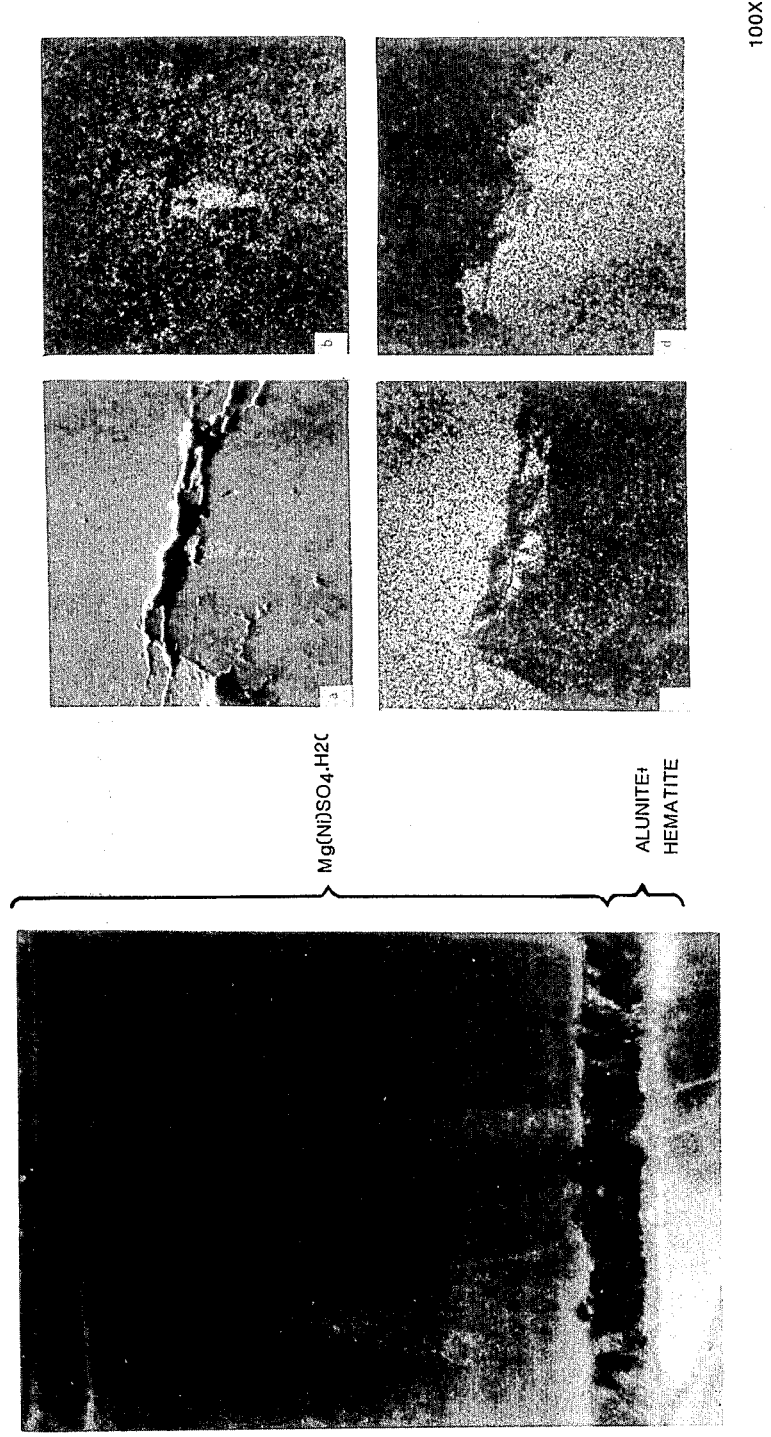
FIG. 5 is a representation of a photomicrograph of a cross section of an 11-mm piece scale sampled from an autoclave taken at 10 times magnification.
FIG. 6 is an electron photomicrograph of the scale interface shown in FIG. 5 taken at 100 times magnification.

The cross section of a scale obtained following Run 4 of Table II is shown by the photomicrograph of FIG. 5 (10 times magnification). This cross section was obtained from an 11-mm thick piece of scale sampled from the north wall of compartment A of the autoclave depicted schematically in FIG. 1. The bottom layer of the scale (1 mm thick) is composed of intergrown crystals of alunite and hematite deposited during start-up of Run 4 using low magnesium ore left over from Run 1. The feed was the switched over to high-magnesium Run 4 feedstock (Table I), during which the upper 10 mm was deposited. This upper layer contains $MgSO_4 \cdot H_2O$ with highly dispersed particles of hematite as well as some nickel.

FIG. 6 shows four portions of highly magnified electron photomicrographs (100 times magnification) of the scale interface shown in FIG. 5. Photo "a" depicts the scale interface between the scale of Run 4 and Run 1 (secondary electron image). Photo "b" is an iron $K\alpha$ x-ray image of the same field shown in "a". The upper layer ($MgSO_4 \cdot H_2O$ scale) has iron uniformly dispersed. The lower layer (alunite and hematite) has iron dispersed in alunite, and concentrated in hematite (one crystal shown). Photo "c" is a magnesium $K\alpha$ image of this field showing the expected concentration of Mg in the upper layer. Photo "d" is an aluminum $K\alpha$ image of the same field illustrating the absence of alunite in the $MgSO_4 \cdot XH_2O$ layer.

Figure 3:
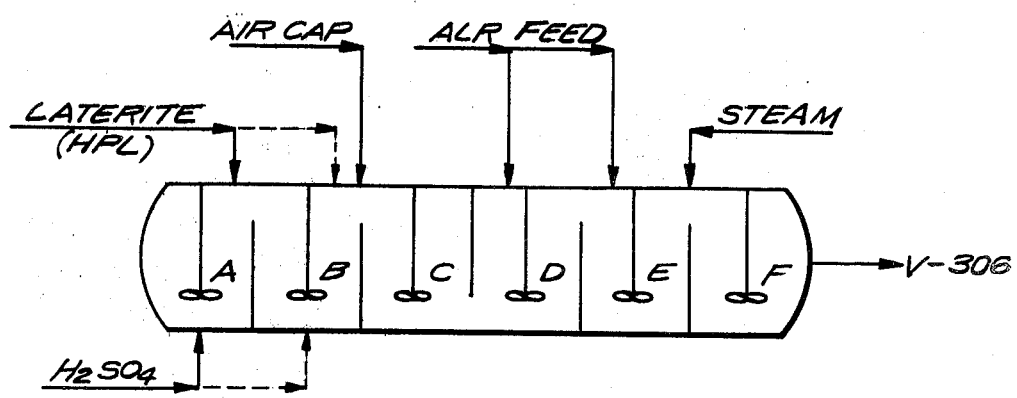
FIG. 3 is similar to FIG. 1 and shows the sequencing of feeding ore, acid and steam to the autoclave for selectively assuring the scale formation of magnesium sulfate while inhibiting the formation of scale containing substantial amounts of alunite.

To be effective as a practical alunite-hematite scale inhibitor, the deposition of magnesium sulfate must be reasonably uniform in all autoclave compartments. FIG. 3 show a profile of ore, acid, and steam additions to the autoclave that is designed to achieve this uniformity. Sufficient ore is added to compartment A to exceed the magnesium solubility in this compartment by about 3 gpl. As much acid as possible is also added to this compartment, commensurate with the titanium materials of construction constraint. High initial acid concentration should also increase nickel extraction, as compared to stage addition. This compartment A set-up has the following features:

(1) Sufficient magnesium is added to inhibit sharply alunite scaling, and to entrain the hematite scale in the magnesium sulfate matrix.

(2) High acid concentration in compartment A allows room for decreasing the acid concentration in compartments B, C and D, which distributes magnesium sulfate deposition downstream.

The runs did not result in a deposit of a protective layer of magnesium sulfate on compartment B and C surfaces due to increasing $H_2SO_4$ concentration (as compared to compartment A), which maintained aqueous magnesium in soluble form. This problem can be corrected by adding L-ore and/or atmospheric leach residue (ALR) directly to compartments B and C (FIG. 3). Ore distribution is adjusted to precipitate the equivalent of about 2 gpl Mg in each compartment. The free-acid concentration in compartment B is maintained lower than in A; also, acid concentration in compartment C is preferably lower than in B. Although hematite deposits along with magnesium sulfate, it is dispersed within the $MgSO_4.H_2O$ matrix and is easily removed by acid dissolution along with magnesium sulfate.

Magnesium sulfate scaling in compartment D was quite high during operation of the four campaigns. This deposition occurred not only due to all the ALR being added at this location, but also because of the sudden drop in free acid concentration in passing from compartment C to D. This problem can be corrected by adding only a portion of the ALR to compartment D. Magnesium deposition is also maintained in compartment E by injecting makeup steam into this compartment rather than into the gas cap. The increase in temperature deposits magnesium sulfate into E while inhibiting co-deposition of amorphous silica. Magnesium solubility decreases with increased temperature, whereas that of silica increases. The temperature differential between compartment E and the rest of the autoclave can be controlled by the amount of air put into the gas cap. The greater the gas partial pressure, the greater the tendency for deposition of magnesium in E during steam sparging. Use of air rather than nitrogen for the gas cap will oxidize a portion of the ferrous iron contained in the garnierite fraction.

The following conclusions are apparent from the tests summarized herein:

(A) Sulfuric acid pressure leaching of nickeliferous laterite ore containing high levels of magnesium silicates leads to deposition of magnesium sulfate which is easily removed by chemical dissolution.

(B) Precipitation of magnesium sulfate is highest in the region where the ore is fed, where acid concentration is low or decreasing, and where temperature is high or increasing.

(C) The magnesium sulfate precipitates as a fine-grained, water-soluble $Mg(Ni)SO_4.H_2O$ double salt having a Mg/Ni ratio corresponding to the ratio of Mg to Ni concentration in the leach liquor.

(D) Magnesium sulfate deposition sharply inhibits the rate of alunite scaling. Hematite precipitates on autoclave internal surfaces along with the magnesium sulfate, but is dispersed within the magnesium sulfate matrix and is removable along with magnesium sulfate by dissolution.

(E) Where there is insufficient magnesium to deposit magnesium sulfate, deposition of hematite and alunite on autoclave surfaces tends to increase with increasing magnesium concentration.

(F) To be effective as a practical alunite-hematite scale inhibitor, magnesium sulfate deposition should be reasonably uniform. This uniformity is controlled by appropriate selection of the ore, acid, and steam-injection locations.

Thus, by controlling the magnesium content in the leach liquor to exceed magnesium solubility by at least about 1 gpl under the prevailing conditions of temperature, acid and salt concentration of the leach liquor, the scale formed comprises substantial amounts of magnesium sulfate with or without alunite and hematite and is easily removed by dissolution with sulfuric acid. The scale may be removed by dissolution with water or sulfuric acid at an acid concentration ranging up to about 100 gpl (e.g., about 20 to 100 gpl) over a temperature range of about 50° C. to 250° C. It is preferred to use an acid concentration of about 30 gpl to 70 gpl at a temperature ranging from about 180° C. to 220° C.

In order to achieve the objectives of the invention, the leaching of low- and high-magnesium nickeliferous oxide and silicate ores can be coordinated in the same leaching regime in order to obtain the type of scale desired.

With regard to low-magnesium limonite, such ores generally contain 0.5 to 2.5% Ni (e.g., 1.25 to 2.5% Ni), about 0.005 to 1% Co, about 0.25 to 10% Mn, about 0.3 to 10% Cr, about 0.2 to 10% Al, up to about 3% or 4% Mg, about 2 to 25% Si and about 20 to 55% Fe making up substantially the balance, the foregoing metal values being present as oxides.

In the case of high-magnesium garnierite, the ore may contain about 0.8 to 5% Ni (e.g., 1.5 to 5% Ni), about 0.005 to 1% Co, about 0.25 to 10% Mn, about 0.3 to 10% Cr, about 0.2 to 10% Al, over about 4 to 30% Mg (e.g., 8 to 30% Mg), about 2 to 40% $SiO_2$ and about 5 to 30% Fe, the metal values being present as oxides and silicates.

In carrying out the high-pressure leaching process, the acid-to-ore ratio by weight may range from about 0.15 to 1 to as high as 0.8 to 1, the preferred ratio being about 0.2 to 1 to 0.4 to 1, the pulp density generally ranging from about 20 to 45 or 50%, the acid-to-ore ratio depending upon the magnesium level in the ore. The acid-to-ore ratio may also range from 0.4 to 1 to 0.8 to 1. As stated hereinbefore, the high-temperature leach is generally carried out at a temperature of about 180° C. to 300° C. and a pressure ranging from about 130 psig to 1230 psig, the pH following leaching being less than about 1, and generally less than about 0.7.

When the scale formation is controlled to contain substantial amounts of magnesium as magnesium sulfate, e.g., at least about 5% Mg, the scale is easily removable by flushing the equipment (e.g., the autoclave, the level-control pot, the pipelines, etc.) with an aqueous solution containing up to about 100 gpl $H_2SO_4$ (20 gpl to 100 gpl), e.g., about 30 to 70 gpl $H_2SO_4$ at a temperature ranging from about 50° to 250° C., e.g. about 180° C. to 220° C., at pressures ranging from about 130 psig to 320 psig.

The terms "ore feed material" or "ore feed" employed in the disclosure and the claims are understood to cover any form of nickeliferous oxide and silicate ore, e.g., lateritic and garnieritic ore, fed to the autoclave, whether fed singly or in separate batches and in which at least a portion of the feed (or a batch) has a high-magnesium content for carrying out the invention. Thus, referring to FIG. 2, one method is to prepare the nickel laterite and/or garnierite ore so that a fines fraction 18 is provided low in magnesium and a coarse fraction 19 high in magnesium which in this instance is used to neutralize under atmospheric conditions the acid of the pregnant liquor, the atmospheric-leach residue 19A (high magnesium) then going to autoclave 16 as shown in FIG. 2. Alternatively, the high-magnesium fraction, with or without roasting, can be sent directly to the autoclave to effect high-temperature neutralization of the acid in the pregnant liquor while providing the necessary amount of magnesium to control scale morphology.

In a still further embodiment, the total ore feed may comprise a batch of limonite ore (low magnesium) and a batch of garnierite ore (high magnesium), the amounts of each making up the ore feed being determined to provide a controlled quantity of a scale containing substantial amounts of magnesium sulfate capable of being easily removed by chemical dissolution with dilute sulfuric acid.

As will be apparent to those skilled in the art, other methods may be employed for controlling the scale desired, such as by directly adding an amount of soluble magnesium-containing material to the leach liquor to raise the level of dissolved magnesium sufficiently to inhibit the formation of scale containing substantial amounts of alunite or alunite and hematite.

Thus, in summary, the invention provides as one embodiment a method for inhibiting the formation of scale containing substantial amounts of alunite during the leaching of nickeliferous lateritic ore by maintaining in the sulfuric acid leach liquor a magnesium concentration at least sufficient to inhibit the deposition of alunite while favoring the formation of scale containing a substantial amount of magnesium. The concentration of magnesium to effect the deposition thereof as magnesium sulfate scale should be at least about 1 gpl in excess of the solubility limit for magnesium sulfate under the prevailing conditions of the temperature of the leach liquor and the acid and salt concentration.

Another embodiment of the invention is directed to a method of controlling scaling of autoclave and leaching equipment surfaces involving the multi-stage high-pressure sulfuric acid leaching of nickeliferous laterite ores containing, in addition to nickel, oxides and silicates of aluminum, iron, and magnesium, wherein the high-pressure leach is carried out on an ore feed material charged to an autoclave while the autoclave is maintained at an elevated temperature in the range of about 180° C. to 300° C. and during which there is a tendency for the formation of scale. The method comprises controlling the magnesium content of at least a portion of the ore feed material to a relatively high level to provide a concentration of magnesium in the sulfuric acid solution during ore dissolution at a level sufficient to inhibit the formation of scale containing substantial amounts of alunite while favoring the formation of scale containing substantial amounts of magnesium as magnesium sulfate characterized by being soluble in water or in dilute sulfuric acid and thereby of being easily removed. Preferably, the magnesium of at least a portion of the ore feed material should be over about 5% by weight of the ore.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of controlling the scaling of autoclave and leaching equipment surfaces in the high-pressure sulfuric acid leaching of nickeliferous ores containing, in addition to nickel, oxides and silicates of aluminum, iron, and magnesium, wherein the high-pressure leach is carried out on an ore feed material charged to an autoclave while the autoclave is maintained at an elevated temperature in the range of about 180° C. to 300° C. at which scaling occurs which comprises:
controlling the magnesium content of at least a portion of the ore feed material to a relatively high level falling within the range of about 3% to 30% by weight and at a pulp density to provide a concentration of magnesium in the sulfuric acid solution during ore dissolution at a level at least sufficient to inhibit the formation of scale containing substantial amounts of alunite while favoring the formation of scale containing substantial amounts of magnesium as magnesium sulfate characterized by being soluble in water or in dilute sulfuric acid and thereby of being easily removed by chemical dissolution.

2. The method of claim 1, wherein at least a portion of the ore feed material charged to the autoclave contains at least about 5% by weight of ore and the pulp density is such as to provide a leach liquor containing at least about 1 gpl of magnesium as magnesium sulfate in excess of the solubility limit of magnesium sulfate under the prevailing conditions of temperature and the acid and salt concentration of the leach liquor.

3. The method of claim 2, wherein following scale formation in which the scale contains substantial amounts of magnesium sulfate, the scale is removed by treatment with an aqueous solution containing up to about 100 gpl $H_2SO_4$ at a temperature ranging from about 50° C. to 250° C.

4. The method of claim 3, wherein the sulfuric acid concentration ranges from about 30 gpl to 70 gpl $H_2SO_4$ and the temperature ranges from about 180° C. to 220° C.

5. The method of claim 1, wherein the magnesium in the sulfuric acid leach solution is also maintained at the desired concentration level by the addition of magnesium sulfate thereto.

6. In a method for controlling the scaling of autoclave and leaching equipment surfaces in the sulfuric acid leaching of nickeliferous ore containing, in addition to nickel, oxides and silicates of aluminum, iron, and magnesium, the magnesium content of the ore being less than about 4% by weight, wherein during high-pressure leaching of nickeliferous ore feed material fed to a multi-stage autoclave maintained at a temperature ranging from about 180° C. to 300° C. at which scaling occurs containing substantial amounts of alunite, the improvement which comprises:
controlling the magnesium content of at least a portion of the ore feed material fed to the autoclave to a level of at least about 5% by weight of magnesium and at a pulp density to provide a concentration of magnesium sulfate in the leach liquor at least sufficient to inhibit the formation of alunite scale while favoring the formation of scale containing substantial amounts of magnesium as magnesium sulfate characterized by being soluble in water or dilute sulfuric acid and thereby of being easily removed by chemical dissolution.

7. The method of claim 6, wherein following scale formation in which the scale contains substantial amounts of magnesium sulfate, the scale is removed by treatment with an aqueous solution containing up to about 100 gpl $H_2SO_4$ at a temperature ranging from about 50° C. to 250° C.

8. The method of claim 7, wherein the sulfuric acid concentration ranges from about 30 gpl to 70 gpl $H_2SO_4$ and the temperature ranges from about 180° C. to 220° C.

9. A method of controlling the scaling of autoclave and leaching equipment surfaces in the high-pressure sulfuric acid leaching of nickeliferous ores containing, in addition to nickel, oxides and silicates of aluminum, iron, and magnesium, wherein the high-pressure leach is carried out on an ore feed material charged to an autoclave while the autoclave is maintained at an elevated temperature in the range of about 180° C. to 300° C., a pressure of about 130 psig to 1230 psig at an acid-to-ore ratio of about 0.15 to 0.8, during which scaling occurs which comprises:
- controlling the magnesium content of at least a portion of the ore feed to a relatively high level falling within the range of about 3% to 30% by weight to provide a concentration of magnesium in the sulfuric acid solution during ore dissolution at a level sufficient to inhibit the formation of scale containing substantial amounts of alunite while favoring the formation of scale containing substantial amounts of magnesium as magnesium sulfate, and
- removing said scale by contacting said scale with an aqueous solution containing up to about 100 gpl $H_2SO_4$ at a temperature of about 50° C. to 250° C.

10. The method of claim 9, wherein the sulfuric acid concentration ranges from about 30 gpl to 70 gpl and the temperature ranges from about 180° C. to 220° C.

11. The method of claim 9, wherein the sulfuric acid concentration ranges from about 30 gpl to 70 gpl and the temperature ranges from about 180° C. to 220° C.

12. In a method for controlling the scaling of autoclave and leaching equipment surfaces in the sulfuric acid leaching of nickeliferous ore containing, in addition to nickel, oxides and silicates of aluminum, iron, and magnesium, the magnesium content of the ore being less than about 4% by weight, wherein during high-pressure leaching of nickeliferous ore feed material fed to an autoclave maintained at a temperature ranging from about 180° C. to 300° C., and a pressure of about 130 psig to 1230 psig at an acid-to-ore ratio of about 0.4 to 1 to 0.8 to 1, scaling occurs containing substantial amounts of alunite, the improvement which comprises:
- controlling the magnesium content of at least a portion of the ore feed material fed to the autoclave to a level of at least about 5% by weight of magnesium and at an ore feed pulp density sufficient to provide an amount of magnesium sulfate in the leach liquor at least sufficient to inhibit the formation of alunite scale while favoring the formation of scale containing substantial amounts of magnesium as magnesium sulfate, and
- removing said scale by contacting said scale with an aqueous solution containing up to about 100 gpl $H_2SO_4$ at a temperature of about 50° C. to 250° C.

* * * * *